(12) United States Patent
Bradley et al.

(10) Patent No.: US 9,109,498 B2
(45) Date of Patent: Aug. 18, 2015

(54) DIMETHYL ETHER (DME) ENHANCED GASOLINE ENGINE

(71) Applicant: Ethanol Boosting Systems LLC, Cambridge, MA (US)

(72) Inventors: John M. Bradley, Manchester, MA (US); Leslie Bromberg, Sharon, MA (US); Daniel R. Cohn, Cambridge, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 0 days.

(21) Appl. No.: 14/336,712

(22) Filed: Jul. 21, 2014

(65) Prior Publication Data

US 2014/0325839 A1 Nov. 6, 2014

Related U.S. Application Data

(63) Continuation of application No. 12/760,676, filed on Apr. 15, 2010, now abandoned.

(60) Provisional application No. 61/169,841, filed on Apr. 16, 2009.

(51) Int. Cl.
*F02M 43/00* (2006.01)
*F02B 7/00* (2006.01)
(Continued)

(52) U.S. Cl.
CPC ... *F02B 1/12* (2013.01); *B23P 6/00* (2013.01); *F02B 7/00* (2013.01); *F02B 7/08* (2013.01);
(Continued)

(58) Field of Classification Search
CPC .............................. F02B 1/12; F02D 19/0647
USPC .............. 123/304, 299, 300, 431, 559.1, 698; 29/888.011
See application file for complete search history.

(56) References Cited

U.S. PATENT DOCUMENTS 4,876,989 A  10/1989 Karpuk et al.
5,097,803 A   3/1992 Galvin
(Continued)

FOREIGN PATENT DOCUMENTS

AT   005936 U1   1/2003
CA   2020317 A1  1/1991
(Continued)

OTHER PUBLICATIONS

Office Action—Restriction—mailed Apr. 10, 2013 in corresponding U.S. Appl. No. 12/760,676.
(Continued)

*Primary Examiner* — Mahmoud Gimie
*Assistant Examiner* — David Hamaoui
(74) *Attorney, Agent, or Firm* — Nields, Lemack & Frame, LLC

(57) ABSTRACT

An engine having DME pilot ignition is disclosed. DME Pilot ignition creates far more energy than a conventional spark plug, thus minimizes the possibility of misfire in the engine map. DME injection can be used in a number of ways. In one embodiment, DME injection replaces the conventional spark plug in an Otto cycle engine. In another embodiment, DME injection is used in addition to spark ignition to minimize the use of DME. In this embodiment, DME injection is only used during those portions of the engine map where misfire may occur, or during those times when a misfire sensor detects misfire. DME injection can also be used in conjunction with alcohol boosting in other embodiments.

15 Claims, 2 Drawing Sheets

(51) Int. Cl.

| | |
|---|---|
| *B23P 6/00* | (2006.01) |
| *F02B 1/12* | (2006.01) |
| *F02B 7/08* | (2006.01) |
| *F02D 19/06* | (2006.01) |
| *F02D 19/08* | (2006.01) |
| *F02M 25/022* | (2006.01) |
| *F02D 41/30* | (2006.01) |
| *F02D 21/08* | (2006.01) |
| *F02D 35/02* | (2006.01) |
| *F02D 41/00* | (2006.01) |

(52) U.S. Cl.
CPC .......... *F02D 19/061* (2013.01); *F02D 19/0647* (2013.01); *F02D 19/0655* (2013.01); *F02D 19/081* (2013.01); *F02D 21/08* (2013.01); *F02D 35/023* (2013.01); *F02D 41/005* (2013.01); *F02D 41/0025* (2013.01); *F02D 41/3029* (2013.01); *F02M 25/0228* (2013.01); *F02D 19/066* (2013.01); *F02D 19/0689* (2013.01); *Y02T 10/36* (2013.01); *Y02T 10/47* (2013.01); *Y10T 29/49233* (2015.01)

(56) References Cited

U.S. PATENT DOCUMENTS

| | | | | |
|---|---|---|---|---|
| 5,477,830 | A * | 12/1995 | Beck et al. | 123/470 |
| 5,485,818 | A * | 1/1996 | McCandless | 123/294 |
| 5,664,535 | A * | 9/1997 | Peeters | 123/193.4 |
| 6,095,102 | A | 8/2000 | Willi et al. | |
| 6,439,192 | B1 * | 8/2002 | Ouellette et al. | 123/299 |
| 6,912,992 | B2 | 7/2005 | Ancimer et al. | |
| 6,951,211 | B2 | 10/2005 | Bryant | |
| 7,036,482 | B2 * | 5/2006 | Beck et al. | 123/229 |
| 8,065,990 | B2 | 11/2011 | Brusstar | |
| 2004/0065274 | A1 | 4/2004 | Cohn et al. | |
| 2004/0149255 | A1 | 8/2004 | zur Loye et al. | |
| 2006/0102136 | A1 | 5/2006 | Bromberg et al. | |
| 2007/0221163 | A1 | 9/2007 | Kamio | |
| 2008/0017170 | A1 | 1/2008 | Moroi et al. | |
| 2009/0043479 | A1 | 2/2009 | Noda et al. | |
| 2011/0100323 | A1 | 5/2011 | Bradley et al. | |

FOREIGN PATENT DOCUMENTS

| | | |
|---|---|---|
| EP | 0801225 A1 | 10/1997 |
| EP | 0957246 A2 | 11/1999 |
| JP | 2008-31966 A | 2/2008 |
| WO | 01/86126 A2 | 11/2001 |
| WO | 2009/005731 A1 | 1/2009 |

OTHER PUBLICATIONS

European Communication dated Feb. 11, 2015 in corresponding European patent application No. EP 12182699.4.
International Search Report and Written Opinion mailed Jun. 15, 2010 in corresponding PCT patent application No. PCT/US2010/031143.
International Preliminary Report on Patentability mailed Oct. 27, 2011 in corresponding PCT application No. PCT/US2010/031143.
Canadian Communication dated May 13, 2013 in corresponding Canadian patent application No. 2,756,274.
Canadian Communication dated Mar. 31, 2014 in corresponding Canadian patent application No. CA 2,756,274.
European Communication dated Oct. 31, 2013 in corresponding European patent application No. EP 10765149.9.
European Communication dated Oct. 14, 2013 in corresponding European patent application No. EP 12182699.4.
Office Action-Restriction-mailed Apr. 10, 2013 in corresponding U.S. Appl. No. 12/760,676.
Office Action mailed Jun. 18, 2013 in corresponding U.S. Appl. No. 12/760,676.
Final Rejection mailed Sep. 25, 2013 in corresponding U.S. Appl. No. 12/760,676.
Office Action mailed Mar. 24, 2014 in corresponding U.S. Appl. No. 12/760,676.

* cited by examiner

DIMETHYL ETHER (DME) ENHANCED GASOLINE ENGINE

This application is a Continuation of U.S. patent application Ser. No. 12/760,676 filed Apr. 15, 2010, which claims priority of U.S. Provisional Application Ser. No. 61/169,841, filed Apr. 16, 2009, the disclosures of which are incorporated herein by reference in its entirety.

BACKGROUND

Spark ignited engines face multiple constraints in operation that limit their efficiency. Two such limitations are misfire and knock. Misfire is the phenomenon whereby the gasoline-air mixture does not ignite in the presence of a spark. Knock is the uncontrolled auto-ignition of the unburned air-fuel mixture during the combustion process.

Lean operation, which is defined as operation in which there is an excess amount of air for the amount of fuel introduced, has been known to increase the efficiency of an engine through the reduction of frictional losses, as well as decreased heat losses to the cylinder wall due to lower combustion temperatures. The $NO_x$ emissions decrease when excess amounts of air are used, and it is possible to decrease NOx emissions to the point where there is no need for NOx aftertreatment. However, in general, this requires an air to fuel ratio that is so great that combustion stability (i.e. cycle-to-cycle variation) suffers, thereby resulting in misfire. A powerful ignition source could allow the operation of an engine at these large excess air-fuel ratios.

An alternative means of operation is to operate the engine at stoichiometric ratios, that is, with enough oxygen to combust all of the fuel, with no excess or shortage of air, and to introduce a high level of exhaust gas recirculation (EGR). The three way catalyst works well under these conditions, and this can be used to control emissions. EGR, and particularly cooled EGR, has been known to decrease the engine tendency to knock by decreasing the temperatures in the cylinder. Because of the effect on the ratio of specific heats, EGR operation is not as efficient as lean operation, but the simplicity of aftertreatment makes this an attractive alternative. Under EGR conditions of more than 15-25%, referred to as heavy EGR, the engine experiences the same problem of misfire as occurs during very lean operation. Again, a powerful ignition source could allow reliable operation at conditions of heavy EGR.

The effect of lean operation and EGR is to dilute the air/fuel mixture. Conditions with heavy EGR or very lean operation are characterized by high dilution of the air/fuel mixture.

In addition to misfire, the second limitation of spark ignited engines is knock, the uncontrolled auto-ignition of the unburned air-fuel mixture during the combustion process. Knock is more prevalent when the fuel-air mixture is under high compression. Thus, knock places severe limitations on the use of high compression ratio, and turbocharging, which limits the potential efficiency of the engine.

Otto cycle engines typically ignite the air-fuel mixture by an electric spark, such as a spark plug. However, where there is high dilution (either through very lean operation or heavy EGR), reliable ignition of the mixture may be compromised. Ignition can be more powerfully administered by injecting a small quantity of easily ignitable (i.e. high cetane number) diesel fuel that is stored in a separate tank. This fuel that is injected for ignition purposes is often called a "pilot fuel", and the process is known as pilot-ignition. This process is capable of delivering far more ignition energy to a lean fuel-air mixture than is possible with a spark plug. As a result, the lean fuel operation of an Otto cycle engine becomes smoother and more reliable by pilot fuel injection that would be possible, relying only on spark ignition.

However, the use of conventional liquid diesel fuel as a pilot fuel in an Otto cycle engine is problematic. There must be considerable excess air (and oxygen) in the fuel-air mixture in order to avoid having an unacceptable portion of the pilot fuel decompose into soot. Also, providing enough excess air to eliminate soot generation is an unattractive solution because, in a given engine, excess air means less fuel is combusted, and therefore less power is produced. Even more important, excess oxygen in the exhaust makes it impractical to use the conventional, efficient and economical 3-way catalysts commonly used to clean the exhaust of stochiometrically fueled spark ignition engines. Therefore, expensive and inefficient diesel exhaust catalyst systems would need to be employed if conventional diesel fuels were to be used as pilot fuel.

Therefore, there exists a need for a method and system that allows lean operation and EGR, without requiring the use of expensive diesel exhaust systems. Such a method and system would require a powerful pilot fuel which does not create the soot associated with diesel pilot fuel.

SUMMARY OF THE INVENTION

The problems of the prior art are overcome by the present system and method, which discloses an engine having DME pilot-spark ignition. DME-spark pilot ignition creates far more energy than a conventional spark plug, thus minimizes the possibility of misfire in the engine map. DME injection can be used in a number of ways. In one embodiment, DME injection replaces the conventional spark plug in an Otto cycle engine, which depends on flame propagation. In another embodiment, DME injection is used in addition to spark ignition to minimize the use of DME. In this embodiment, DME injection is only used during those portions of the engine map where misfire may occur, or during those times when a misfire sensor detects misfire. DME injection can also be used in conjunction with alcohol boosting in other embodiments.

DETAILED DESCRIPTION OF THE INVENTION

Figure 1:
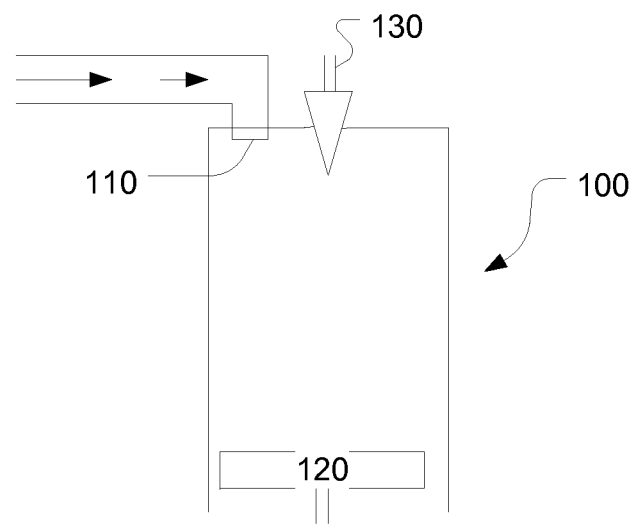
FIG. 1 is a schematic drawing of a first embodiment of the present invention.

Dimethyl ether (DME) is a gas at atmospheric pressure that condenses at −22° C. at atmospheric pressure. At slightly elevated pressures, such as around 6 bar, DME is a liquid at room temperature. DME is unique among compression ignition fuels in that it has no carbon-carbon bonds in its molecule, and therefore it does not produce soot even when burned stochiometrically in a compression ignition engine. Furthermore, DME is very easily ignited in a compression ignition engine, as it has a cetane number greater than 55. Therefore, a relatively small amount of dimethyl ether may be used as a pilot fuel for an Otto cycle engine, where electric spark is also present.

The primary fuel, ignited by the DME-sparking, can be a variety of fuels, such as gasoline, natural gas, alcohols, alcohol-gasoline blends, propane or other hydrocarbon fuels, or it can be waste fuels, such as low heating value fuels (producer gas, or landfill gas).

Another benefit of DME is that it can be easily produced from methanol. Methanol is a transportation fuel, which can be readily produced by conversion of synthesis gas from natural gas, biomass, coal or wastes. For a vehicle that has onboard methanol, it is possible to generate DME directly from the methanol by dehydration, which is easily done at mild conditions (at relatively low temperatures, as low as 500 K) using a catalyst. The onboard methanol can be present in either methanol-water mixtures (such as windshield wiper fluid) or can be separated from gasoline-methanol blends. This separation of methanol from gasoline can be achieved through the use of a membrane or by the addition of a compound that will remove it from the gasoline-methanol mixture, such as water, or a combination of the two.

DME has fast combustion under conditions typical of spark timing (with high temperatures). However, there is a time delay between the introduction of DME to the cylinder and its combustion. This time delay can be as short as 1 crank angle (CA) degree, or can be as long as 10 CA degrees, depending on operating conditions. The time of injection may need to be adjusted in order to get the appropriate "sparking", defined as the initiation of combustion by the formation of a very strong ignition kernel, of the air-fuel mixture. The timing of the DME-sparking (DME-spark pilot ignition) can be adjusted by adjusting the DME SOI (Start-Of-Injection) timing, the injection rate, or both. A further possibility is the use of multiple DME injections, with fraction of the DME injected early in the cycle, and a fraction injected later in the cycle.

It is desirable to have the injection rate be high, that is, injecting the DME over a few crank angle degrees of engine revolution, in order to provide more powerful sparking. Typical injection numbers are 5-30 CA degrees. Little is gained from an injection system capable of injection durations that are much less than the ignition delay. The DME-sparking conditions are determined by the amount of DME injection, the SOI timing, the DME combustion delay and the rate of injection of the DME.

The injection of DME occurs at relatively high pressures in the cylinder, as it occurs at times where conventional electric sparking would occur. In conventional naturally aspirated vehicles, this occurs when the pressure in the cylinder is at about 10 bar pressure. Thus, the DME needs to be at elevated pressures, but pressure that are more associated with direct injection gasoline (i.e., on the order of 100 bar) rather than diesel injection (1000 bar). However, higher pressure injection (higher than 100 bar) or lower pressure injection (lower than 100 bar) are not excluded from this invention.

The DME-sparking can be used for either starting of a conventional flame-front propagation process (as in conventional Otto SI engines), or it can be used for achieving appropriate timing in HCCI (Homogeneous Charge Compression Ignition) or its variants (such as PCI). However, creating the propagating kernel required for robust flame propagation requires substantially less energy than that required for robust HCCI/PCI operation, especially when the rate of pressure rise is limited.

The use of DME as a pilot fuel for DME-sparking may be especially advantageous when a standard highly turbocharged diesel engine is modified to operate as a stochiometrically fueled Otto cycle engine with alcohol or alcohol-water mixture boosting. Such as engine is known as an alcohol boosted Otto cycle (ABOC) engine. In an ABOC engine, direct injection of these alcohol-based fuels is used at high torque to prevent knocking of gasoline or other fuels that are used in spark ignition engines. However, one potential problem of operating with alcohol or alcohol-water mixtures is that at very high torque, when large amounts of anti-knock agent are required, combustion stability (i.e. misfire) may be a problem. One benefit of the DME system is that alcohol-water mixtures with low concentrations of alcohol, and even mainly water fluids, can be used with the DME ignition system. As a comparison, a spark can provide about 50 mJ ignition energy, while DME can provide many orders of magnitude more energy (10-100 J), even while the DME is a small fraction of the total fuel. The volume of DME injected may be less than about 1 microliter (1 microliter corresponds to about 20 J thermal energy when the DME combusts). The preferred amount of DME injected may be between about 5 microliter (about 100 J combustion energy release) as a maximum, and about 0.01 microliter (about 0.2 J combustion energy release) as a minimum.

The amount of DME required for pilot ignition depends on the engine conditions. Although 5% diesel injection has been used in different applications for natural gas/diesel engines (compression-ignition engines), it is possible to inject substantially less for ignition of a homogeneous or near-homogeneous engine. For example, a Heavy Duty engine operating at 400 kW, if 1% of the fuel is used for DME-spark ignition, the energy released in the DME combustion corresponds to about 250 J. This is a value that is more than 3 orders of magnitude larger than the power possible from sparking. The injected power decreases as the power of the engine decreases, but the calculation above indicates the strength of the DME-sparking concept. That is, the power required for starting the process of flame propagation in a homogeneous mixture is smaller than that required for pilot ignition of a diesel engine, where substantial increases in temperature and pressure are required for appropriate compression ignition of the primary fuel.

The DME-spark pilot ignition is used to provide a strong kernel that minimizes the variation of the 0-10% combustion of the fuel, which drives the large variations measured with the COV of IMEP (Coefficient of Variation of Indicated Mean Equivalent Pressure), which is used to quantify misfire. It is possible to use less DME at the lower loads that still require ignition assist, while increasing the amount with increased torque. Over the entire engine torque-speed map, the amount of DME used in the pilot ignition can be adjusted, depending on engine conditions (engine speed and/or torque). The adjustments can be made either from look-up tables in the engine control unit (ECU) or through feedback using a misfire sensor or a combination of sensors that can be used to monitor misfire.

In principle, it is thus possible to use DME-sparking as ignition of a homogeneous or near homogenous main-fuel mixture throughout the entire engine map. It may be desirable to do so in conditions where DME is widely available. Not only will the DME-spark pilot ignition eliminate the need to add a spark ignition to a diesel engine that is retrofitted to operate as an Otto engine, but also, by its use, it will not be necessary to replace the existing diesel engines' cylinder heads with heads that are designed and drilled to accommodate a spark plug in addition to a fuel injection nozzle. The avoidance of the need to introduce a spark plug may be particularly important for small diesel engines, such as those used for small passenger cars, where space for engine penetrations is limited. One potential advantage of this system is the possibility of retrofitting diesel engines to operate as high pressure, high compression ratio, homogeneous or near-homogeneous engines, with the primary fuel (non-pilot fuel) (such as gasoline, natural gas, propane, methanol or other alcohols) being either separately directly injected into the cylinder or port fuel injected (that is, injected in the manifold upstream from the engine inlet valves).

The modification of a production highly turbocharged diesel engine may be minor and inexpensive, and the cost to modify the production line in a factory to produce such an engine into a properly designed ABOC engine may also be small. The hardware modifications include the replacement of the diesel injectors/pump by DME injectors/pump, the addition of primary-fuel injectors (either directly injected into the cylinder, or premixed with the air upstream from the valve, either through carburetion or through port-fuel-injection, PFI), and possibly the addition of a spark ignition system, if desired. The spark plug could be integrated with the DME injection, in order to avoid the need for drilling spark access holes into the cylinders.

The combination of a conventional electrical spark plug with a DME-spark is attractive in that the DME-spark allows for efficient engine operation, which minimizes the consumption of the primary fuel, and thus operators would be encouraged to maintain the DME tank full. The engine could operate with just the electrical spark plug, but efficiency, and potentially performance (that is, highest torques) could suffer. However, the vehicle could be operational (although potentially at lower power and lower efficiency) in the absence of DME.

Alternatively, it is possible to add an electrical spark ignition system that would be used in engine operating conditions that do not require DME, in order to minimize the consumption of the DME-spark fuel. Depending on the engine design and operation, at light loads, and with stoichiometric operation, the fuel-air mixture can be ignited with a conventional or high power spark ignition system. Alternatively, it is possible to operate the engine with high dilution (heavy EGR or very lean operation) at light loads and heavy loads with DME-spark pilot ignition used for sparking, but at intermediate loads, utilize electrical spark ignition. Efficiency can be increased at the light load by the use of high dilution, while high dilution is used at high torque to prevent knock. At conditions of high dilution where misfire would otherwise be a problem, DME-spark pilot ignition can be used. The use of DME could be minimized by using it only at the time in the burn cycle when it is necessary to provide combustion stability, which is typically during the last 30% of the compression stroke, and in only the amount needed to provide it. The use of DME could also be minimized by using it over a range of torque and speed where it would have the greatest effect on increasing efficiency.

It is possible to use both electrical spark and DME-spark pilot ignition systems when DME-spark is used.

The present invention enables manufacturers of turbocharged diesel engines to make a high-cylinder-pressure Otto-cycle engine by replacing the expensive high-pressure diesel fuel injector systems (which includes a high pressure pump) with lower cost, lower pressure injector systems for a combustible pilot injection system. The present invention also replaces the present high cost and low efficiency of exhaust cleanup equipment of present diesel engines with the low cost, extremely efficient 3 way catalyst systems presently used for spark ignition engines. The conversion of a turbocharged diesel engine into an ABOC engine will greatly increase the power output of the engine compared to what could be produced operating on conventional diesel fuel, because, in its converted form, this engine need not use considerable excess air and large fraction of EGR to prevent soot emissions and NOx emissions and also because the converted engine can operate at a higher RPM, as diesel engines are commonly operated at substantially lower engine speeds than gasoline engines.

DME-spark can also be employed as a means to substantially enhance knock suppression. The enhanced knock suppression can either be used in engines that employ directly injected alcohol for knock suppression, or in conventional engines that do not employ use of a separately controlled, directly injected knock suppressant. DME-spark pilot ignition can be used to provide knock resistance at high torque by enabling combustion stability of engines operating with high dilution. As noted above, high dilution operation has a powerful knock suppression effect but its use is inhibited by the loss of combustion stability. DME-spark pilot ignition removes this limitation. DME-spark pilot ignition eliminates the variation in combustion timing associated with low flame speed, thus making operation possible at substantially higher levels of EGR that would be otherwise possible (limited to about 15%-20% in conventional engines). The DME may be introduced into the engine as needed from a second source, while the gasoline, natural gas or other fuel that comprises the primary fuel used in Otto-cycle engines is introduced from a first source. In some embodiments, DME is used in place of direct alcohol injection from a separate tank. In another embodiment, DME is used in conjunction with direct alcohol injection. For example, alcohol or alcohol-water mixtures can be injected into the cylinder to reduce knocking. When the amount of water in the mixture begins to cause misfire, DME can be introduced. Furthermore, the EGR used for dilution could be cooled EGR.

The DME-spark pilot ignition could be used with direct injection of a range of alcohol-water mixtures, having a latent heat of vaporization of at least 0.5 MJ/kg in order to prevent engine knock.

In addition to normal operation use of DME-sparking, the possibility of having multiple fuels is very useful for transients. In particular, hydrocarbons emissions of Otto-cycle engines are dominated by emissions during cold start, where substantial over-fueling is required in order to achieve combustible mixtures, and wall wetting is a potential problem. There are techniques for controlling cold start emissions, such as absorber catalysts, rapidly heated catalysts and others, but these techniques increase costs. With the availability of DME onboard, it is possible to minimize cold start emissions by operating with DME-sparking during the cold start, minimizing the amount of fuel enrichment needed, or even with DME providing a large amount of the fuel requirement during a few seconds during the engine warmup period, up to about 30 seconds. If the engine is mostly DME-fueled, it would perform as a diesel engine (i.e., compression ignition) during these few seconds, although it would be possible and preferable to also use conventional primary fuel, either DI or PFI. The DME-spark fuel should burn cleanly, without the production of soot, and completely. In the case of PFI of the primary fuel, there is an uncertainty about the amount of fuel that was left behind in the inlet manifold during the previous engine shutdown process. Even with DME dominated start-up, the amount of DME required over the cycle is not very large, as the engine is rarely operated at high power during the cold start period and this period is relatively short.

To summarize, DME pilot injection can be used in a variety of embodiments.

In one embodiment, DME pilot ignition is used with an Otto cycle engine, such that the spark plug is replaced by an injector for DME. Because of the increased energy associated with DME, misfire can be minimized as compared to conventional spark plug equipped engines. Because of this, lean or heavy EGR operation can be employed more aggressively at low and high torque. FIG. 1 shows a representative cylinder 100, where a mixture is introduced to the cylinder 100 through one or more intake valves 110. In some embodiments, the primary fuel is mixed with the air prior to its introduction to the cylinder 100, such as via port fuel injection. In other embodiments, primary-fuel is directly injected into the cylinder 100. When the piston 120 compresses the fuel/air mixture, an injector 130 injects DME into the cylinder 100. The temperature and pressure of the fuel-air mixture causes the DME to auto-ignite, creating a robust kernel that allows for flame propagation and combustion of the primary-fuel/air mixture. This injection of DME replaces conventional spark plug operation.

Figure 2:
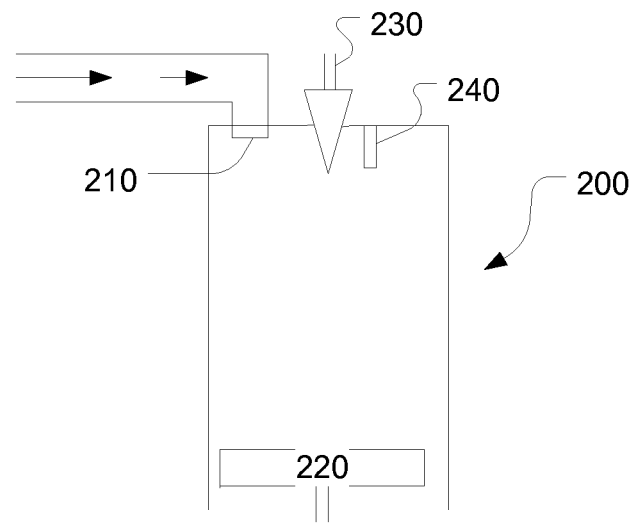
FIG. 2 is a schematic drawing of a second embodiment of the present invention.

In another embodiment, DME consumption is minimized by the use of both DME-spark pilot ignition and spark ignition. During those parts of the engine map where diluted operation is not required, electrical spark ignition is used to minimize the use of DME. During high dilution operation, DME-spark pilot injection is used. It is also possible to use both spark and DME-spark pilot ignition during these times. Also, spark ignition may be used in cases that the DME source has been depleted. FIG. 2 shows a representative cylinder 200, where both spark ignition and DME-sparking are used. As described above, the primary fuel is mixed with air prior to its introduction to the cylinder 200 via intake valve 210. In other embodiments, fuel is directly injected into the cylinder 200. In some situations, an injector 230 injects DME into the cylinder 200. The temperature and pressure of the fuel-air mixture cases the DME to auto-ignite, causing combustion of the primary-fuel/air mixture. In other situations, the spark plug 240 is used to ignite the primary-fuel/air mixture. In some embodiments, both DME-sparking and spark ignition are used simultaneously.

Figure 3:
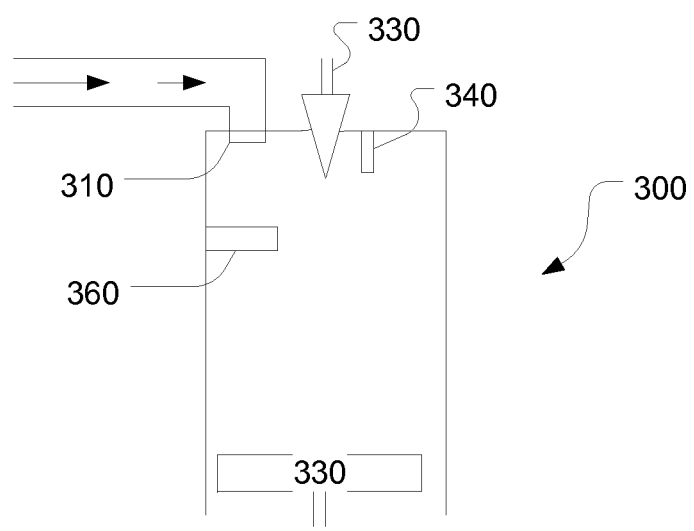
FIG. 3 is a schematic drawing of a third embodiment of the present invention.

In another embodiment, alcohol boosting is used in conjunction with DME-spark pilot ignition for Otto-cycle engines. Alcohol boosting is used to eliminate knocking at high torque. However, for high concentrations of water, the boosting antiknock agent may compromise the combustion quality of the fuel-air mixture. At these parts of the engine map, DME ignition is used to prevent misfire. FIG. 3 shows a representative cylinder 300, having DME injector 330, an alcohol/antiknock agent injector 360, a spark plug 340, an intake valve 310 through which the primary-fuel/air mixture is introduced into the cylinder. Alcohol or another antiknock agent is direct injected through injector 360 into the cylinder 300 to prevent knock. DME may be injected through injector 330 to prevent misfire. In some embodiments, a spark plug 340 is used when DME is not needed. In some embodiments, both DME-sparking and electrical spark ignition are used simultaneously. In other embodiments, DME-sparking is used throughout the engine map. The antiknock agent can be substantially all water, directly injected into the cylinder.

The primary fuel of a DME-spark pilot ignition enhanced engine can be gasoline or any reasonably volatile and combustible liquid or gas, such as natural gas, propane, and other hydrocarbon fuels, or other fuels for stationary applications, for example, fuels such as air-blown producer gas, blast-furnace byproduct gas, carbon black byproduct gas, or other low heating value fuels, such as landfill gas. This primary fuel can be injected into the cylinder either through port fuel injection of directly injected into the cylinder.

The DME-spark pilot ignited engine of the present invention requires a relatively small DME tank and a pump system. In some embodiments, the DME-sparking is used to provide optimal timing in the combustion cycle for enabling misfire-free high dilution operation, such as during the last 30% of the compression stroke. DME-spark pilot ignition can thus be used as a means to enable high engine efficiency through high compression ratio, high pressure, downsized operation that would not otherwise be possible.

The amount of DME that would be required is very small since it would only be needed during part of the burn time and would only be used at higher values of torque. The amount of DME that is needed could be around 0.1% of gasoline consumption, corresponding to around 4 gallons over the 10 year life of a mid size car. The DME could be provided in canisters that are replaced at the dealer, garage or service station. DME is easy to contain in a liquid form under modest pressure. The required pressure is lower than that needed to liquefy propane.

In one embodiment, the air, DME and primary fuel ratios would be controlled as the torque is increased so as to provide substantially stoichiometric fuel-air ratio and enable the use of a 3-way catalyst for exhaust after treatment.

It may be desirable to further minimize the amount of DME required. DME use may be minimized by using it only when high dilution is needed to control knock and would otherwise occur. The DME use could be minimized by using only the amount that is needed to prevent misfire at a given point in the torque-RPM engine map. The amount of dilution that would be used could be determined by closed loop control with a knock sensor and the amount of DME that is needed could be determined by closed loop control using a misfire sensor or by an open loop control system using an engine map.

The control strategy would thus sense the level of knocking in the engine. The amount of anti-knock agent (such as alcohol or alcohol-water mixture or mainly water) can be then selected to prevent knock. If the amount of anti-knock agent used then causes misfire, DME could be introduced into the cylinder in an amount necessary to eliminate misfire. This can be done instead of spark ignition, or in addition to spark ignition.

If there are no alcohol or alcohol-water mixtures, heavy EGR enabled by DME-spark pilot ignition may be used. The volume of EGR is determined based on the knock sensor. The amount of DME injected is monitored to provide the minimum required to prevent misfire.

One possible control strategy is to monitor knock, either through open loop or closed loop means using a knock sensor. When knock conditions are determined, EGR is introduced. When misfire is being predicted or monitored, DME-spark pilot injection is used. The amount of DME used in the DME-spark injected is monitored to provide the minimum required to prevent misfire. In an operating mode that is used to minimize DME use, during at least part of the time that the DME is employed to enable the heavy EGR needed to present knock, the ratio of DME to gasoline is increased with increasing torque.

Another embodiment for use of DME-spark enabled heavy EGR enhanced knock suppression to is use DME-spark enabled heavy EGR operation at the lower end of the high torque region where knock suppression is needed. A directly injected alcohol or alcohol-water mixture from a third source could be used at higher values of torque to prevent knock. This could allow a higher level of knock free torque than would be possible with DME-spark enabled heavy EGR alone, while greatly reducing the amount of directly injected alcohol that is needed. In addition, the EGR level at the higher torque values would be reduced to get the maximum peak performance of the engine at the limit of turbocharging and engine strength constraints. The directly injected alcohol consumption might, in this way, also be reduced to a very low level, such as on the order of 0.1% of the primary fuel (gasoline or otherwise) consumption.

For periods of extended high torque operation, increased spark retard, either automatically provided or activated by the driver could be used to reduce the amount of EGR and DME that is required. Spark retard, in the frame of DME pilot injection, is related to delayed injection of DME. As mentioned above, the electrical spark plugs can also be activated in those cycles where the DME pilot ignition is also being used.

For the light load application of DME where DME enabled high dilution operation is used to increase efficiency by reducing pumping losses and improving thermodynamic efficiency, the control strategy may monitor misfire. As misfire is predicted or observed, using either open or closed loop techniques, DME-spark pilot injection is started. The amount of DME injected is monitored to provide the minimum amount required to prevent misfire. It is possible to use simultaneously the spark plug as well as the DME-spark pilot ignition system.

An additional control option is to vary the extent of DME use so as to limit the rate of DME consumption. DME enabled heavy EGR operation can be limited to a smaller part of the torque-speed map, thereby providing a tradeoff between efficiency gain and DME consumption. This tradeoff could be performed automatically according to a preset control strategy or determined by the driver.

The DME could be provided in containers that are readily placed and removed from a vehicle. DME could be produced a various locations from small reactor systems that produce it from methanol. In other embodiments, the DME can be generated onboard, as described above.

Although DME is disclosed as the pilot ignition fuel, there are other fluids that can also be used. Any fuel that has high cetane number can be used. DEE (diethyl ether) has even higher cetane numbers, will autoignite at temperatures as low as 160° C., but has C—C bonds that may result in small amounts of smoke. In addition, it is possible to use diesel fuel under conditions where some smoke is acceptable. Thus, although the term "DME-spark ignition" is used throughout the disclosure, the concepts apply to other pilot fuels as well and the disclosure is not limited to only DME.

In some embodiments, the amount of DME required for DME-spark pilot ignition is so small that its magnitude may be held constant through the engine map. That is, the same amount of fuel is injected when the DME-spark pilot ignition is used, allowing the use of simple injectors.

Because of the DME characteristics, fast evaporation (near flash-evaporation) of the DME occurs. Since a robust kernel is desired, it is preferred not to have large penetration of the DME, thus producing a hotter, although smaller kernel than if high pressure injection (with long penetration) is used. Thus very high pressure injectors, commonly used in diesel engines, are not required.

Plunge injectors, capable of either variable fuel injection or constant fuel injection, can be used to inject and meter the amount of DME-spark pilot ignition fuel. Because of the small amount of fuel required, alectrically-driven plunge injectors could be used.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method of modifying a turbocharged or supercharged diesel engine to operate as a stoichiometrically fueled alcohol boosted Otto cycle (ABOC) engine, comprising:
   procuring a turbocharged or supercharged diesel engine, said engine having a compression ratio greater than 10, said engine comprising a primary fuel tank for storing a primary fuel that powers said engine;
   modifying said turbocharged or supercharged diesel engine by:
      installing a pilot compression ignition fluid storage tank adapted to store dimethyl ether;
      installing an alcohol fluid storage tank for the storage of alcohol fluids;
      installing a pilot compression ignition fluid pump in communication with said pilot compression ignition fluid storage tank;
      on each cylinder head;
         replacing a diesel fuel injector with a pilot compression ignition fluid injector, wherein said pilot compression ignition fluid injector is in communication with said pilot compression ignition fluid pump; and
         installing an alcohol fluid injector in communication with said alcohol fluid storage tank; and
   configuring said engine to operate as a stoichiometrically fueled alcohol boosted Otto cycle (ABOC) engine with dimethyl ether pilot ignition, such that:
      the primary fuel, dimethyl ether, and alcohol fluid are combined in stoichiometric ratios within each cylinder head;
      compression ignition of dimethyl ether is used to initiate flame propagation and is the only source of ignition;
      an amount of alcohol fluid is directly injected into a cylinder in said engine to prevent knock; and
      an amount of dimethyl ether is varied to prevent misfire.

2. The method of claim 1, wherein installing a pilot compression ignition fluid pump comprises replacing a diesel fuel pump with a pilot compression ignition fluid pump.

3. The method of claim 1, further comprising replacing a diesel exhaust cleanup system with a three way catalyst system for exhaust gas treatment.

4. The method of claim 1, further comprising adding a primary fuel system.

5. The method of claim 4, wherein the primary fuel system comprises a primary fuel injection system for either liquid or vapor primary fuels.

6. The method of claim 5, wherein adding a primary fuel injection system comprises adding a primary fuel injector on said cylinder head.

7. The method of claim 5, wherein adding a primary fuel injection system comprises adding a port fuel injector upstream of an intake valve on said cylinder head.

8. The method of claim 1, wherein the alcohol fluid is selected from the group consisting of methanol, ethanol, and ethanol-water mixtures.

9. The method of claim 1, wherein configuring said engine to operate such that an amount of dimethyl ether is varied to prevent misfire comprises:
   configuring said engine such that combustion is initiated by increasing the level of dimethyl ether introduced into a cylinder of said engine during lean operation or high dilution of said fuel/air mixture.

10. The method of claim 1, wherein modifying said turbocharged or turbocharged diesel engine further comprises installing a knock sensor, and wherein configuring said engine to operate such that an amount of alcohol fluid is directly injected into a cylinder in said engine comprises:
configuring said engine such that knock is determined with said knock sensor;
in response to said knock, the amount of alcohol fluid is determined to supply to said engine to reduce said knock; and
the determined amount of alcohol fluid is supplied into said cylinder.

11. The method of claim 1, wherein the amount of dimethyl ether is determined by closed loop control using a misfire detector.

12. The method of claim 1, wherein the amount of dimethyl ether is determined by open loop control using an engine map.

13. The method of claim 1, wherein combining the primary fuel, dimethyl ether, and alcohol fluid in stoichiometric ratios within each cylinder head comprises controlling a ratio of air, primary fuel, and dimethyl ether to provide a substantially stoichiometric fuel/air ratio as torque is varied.

14. The method of claim 1, further comprising introducing dimethyl ether into said cylinder at some time during the last 30% of a compression stroke.

15. The method of claim 1, wherein the amount of dimethyl ether is varied between 0.01 microliters and 5 microliters per cylinder.

* * * * *